United States Patent [19]

Huang

[11] Patent Number: 6,141,704
[45] Date of Patent: Oct. 31, 2000

[54] PARALLEL PORT FOR CONNECTING MULTIPLE DEVICES AND THE METHOD FOR CONTROLLING THE SAME

[75] Inventor: Ming-Sung Huang, Chungli, Taiwan

[73] Assignee: Mustek Systems Inc., Hsin-Chu, Taiwan

[21] Appl. No.: 09/070,679

[22] Filed: Apr. 30, 1998

[30] Foreign Application Priority Data

Oct. 13, 1997 [TW] Taiwan ................................. 86114969

[51] Int. Cl.[7] .................................................. G06F 13/14
[52] U.S. Cl. .................................. 710/15; 710/7; 710/8; 710/20
[58] Field of Search .............................. 710/7, 8, 15, 20, 710/32, 36, 58

[56] References Cited

U.S. PATENT DOCUMENTS

| | | | |
|---|---|---|---|
| 4,837,675 | 6/1989 | Bean et al. ................................. | 364/200 |
| 5,058,055 | 10/1991 | Takemoto et al. ....................... | 364/900 |
| 5,297,262 | 3/1994 | Cox et al. ................................. | 395/325 |
| 5,758,190 | 5/1998 | Johnson et al. ............................. | 710/48 |
| 5,894,583 | 4/1999 | Johnson et al. ............................. | 710/48 |
| 5,901,327 | 5/1999 | Ofek ............................................. | 710/5 |

*Primary Examiner*—Thomas C. Lee
*Assistant Examiner*—Harold Kim
*Attorney, Agent, or Firm*—Ladas & Parry

[57] ABSTRACT

A method of controlling a parallel port for connecting multiple devices is disclosed. The method controls the connection between a computer and one of the peripheral devices by way of using the different on-line codes corresponding to the peripheral devices respectively. Further, a common off-line code is set and shared by all peripheral devices. When the off-line code is sent out, all peripheral devices are disconnected from the computer, and the control status of the previous on-line device is backed up for the use of recovering the previous on-line state. Furthermore, a parallel port for connecting multiple devices is also proposed to incorporate with the controlling method such that the computer can switch the on-line state between an on-line peripheral device and the other peripheral standby devices.

11 Claims, 2 Drawing Sheets

6,141,704

PARALLEL PORT FOR CONNECTING MULTIPLE DEVICES AND THE METHOD FOR CONTROLLING THE SAME

BACKGROUND OF THE INVENTION

1. Field of the Invention

The present invention relates in general to a parallel port and a method for controlling it, and more specifically, to a parallel port for connecting multiple devices and the method for controlling the same.

2. Description of the Related Art

As the glowing popularity of multimedia applications, scanners have been standard components of personal computer systems. At present, scanners are generally connected to a computer system through a print port, in order to avoid the inconvenience of having to plug in any SCSI card or any special interface card inside the computer and to simplify the installation so that the complicated tasks such as adjusting the I/O port, IRQ, and lack of expansion slot are no concern. It is very convenient to use the scanner by means of driver programs running in the computer system.

However, since the scanner is connected to a computer through a printer port, the printer can not be connected to the computer. In general, the voltages of the control signal on the control bus of the parallel port can be used for controlling the on-line and off-line states between the peripheral devices and the computer in order to use a single port to connect both printer and scanner to a computer simultaneously. For example, when the voltage level of the SLCT-IN signal line in the parallel port is low, the printer is connected and driven to operation, and when the voltage level of the SLCT-IN signal line in the parallel port is high, the scanner is connected and driven to operation. Although the above method can achieve the object of connecting both a printer and scanner to a computer simultaneously, the SLCT-IN control line is occupied, so no other peripheral device requiring control by all the four control signal lines can be connected.

SUMMARY OF THE INVENTION

Accordingly, an object of the present invention is to provide a method for controlling a parallel port to allow connecting multiple devices. Every peripheral device has assigned a specific on-line code respectively, and the connection with a computer will be established according to their own on-line codes. An off-line code is set and shared by all peripheral devices, the peripheral devices release the status bus of the parallel port and are disconnected from the computer while receiving the off-line code, and at the same time, the control signals are stored in a latch device.

The other object of the present invention is to provide a parallel port for connecting multiple devices. In cooperation with the controlling method according the present invention, the computer can switch its connection state between one device and one of the other standby devices.

In order to achieve the above objects, a method of controlling parallel port for connecting multiple devices to a computer, according to the present invention provides, comprises the following steps.

When the computer is to switch its on-line state from a first device (which is one of the multiple devices and keeps on-line to the computer originally) to a second device (one of the other devices), the computer stores the present control status and data status of the first device. The computer outputs an off-line code through a data bus to disconnect the connection with the first device and stores the control signals of the first device. The computer outputs the control signals of the second device through a control bus and the on-line code of the second device through the data bus to connect the second device to the computer and drive the second device.

When the computer is to switch its on-line state from the second device to the first device, the computer delivers the off-line code through the data bus to disconnect the second device from the computer and stores the control signals of the second device. The computer recovers the control status of the first device stored previously and delivers the on-line code of the first device to connect the first device with the computer. The computer further recovers the data status of the first device to return to the on-line state of the computer connected to the first device.

In addition, a parallel port for connecting multiple devices to a computer is also provided, comprising: a parallel port connector for connecting the computer; and a plurality of control units connected to the parallel port connector in parallel.

Further, each control unit is connected with a peripheral device, and comprises: a recognition device the input of which is coupled to the data bus of the parallel port connector, controlling the on-line and off-line states between the computer and the peripheral device by means of receiving the various identification codes on the data bus; a latch device wherein the input of the latch device is coupled to the control bus of the parallel port connector, and the output of the latch device is coupled to the control input of the peripheral device, and the control signals for controlling the peripheral device are to be transmitted to the peripheral device or latched according to the output signals from the recognition device coupled to the control input of the latch device; and a selecting device receiving the output signals from the recognition device to determine the connection between the status bus of the parallel port connector and the status output terminal of the peripheral device.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

Figure 1:
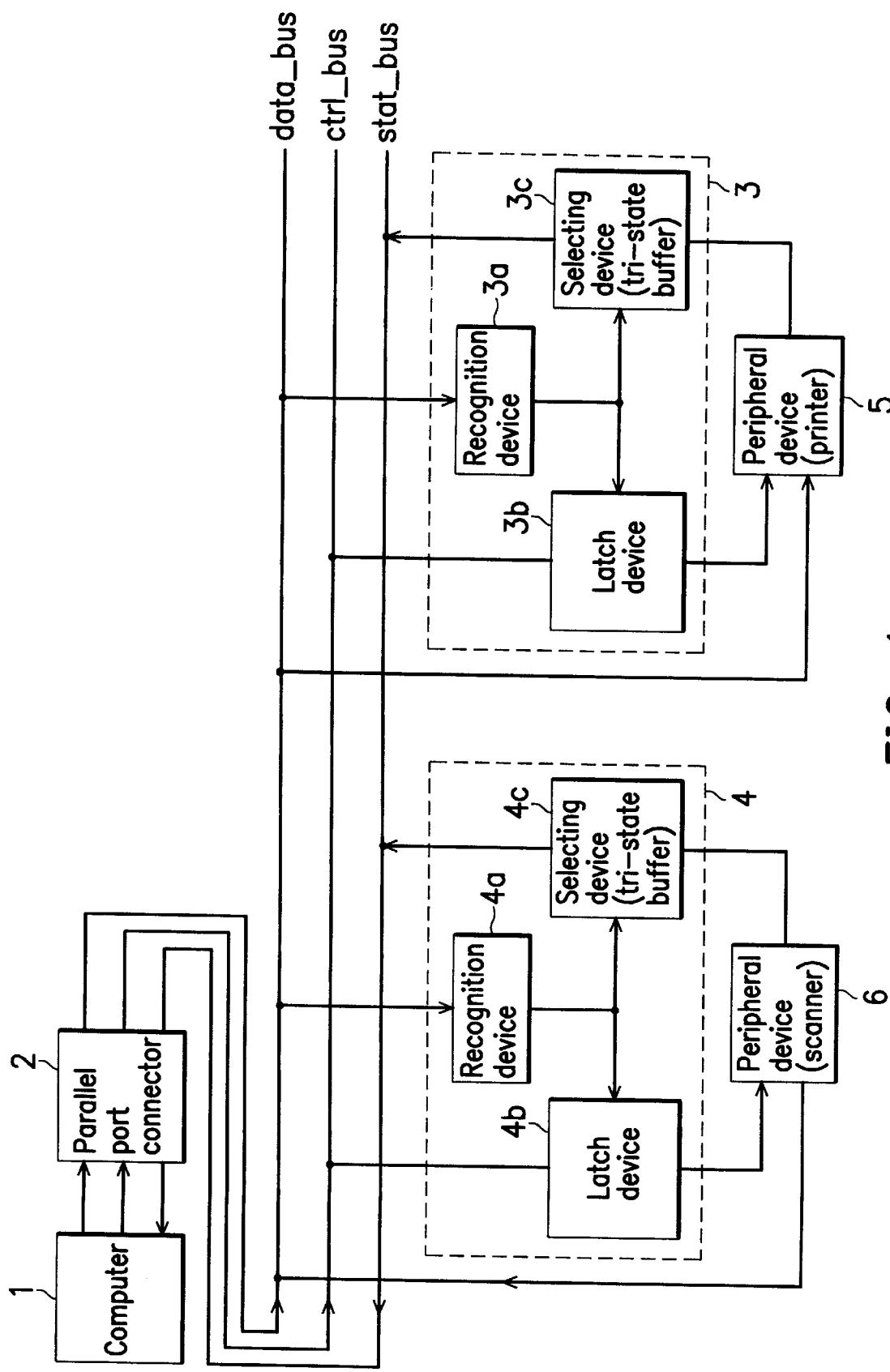
FIG. 1 schematically depicts a circuit block diagram of a preferred embodiment of a parallel port for connecting multiple devices in accordance with the present invention.

FIG. 1 schematically depicts a circuit block diagram of a preferred embodiment of a parallel port for connecting multiple devices in accordance with the present invention. For brevity, a parallel port for connecting two ports is demonstrated as follows.

Referring to FIG. 1, the parallel port in accordance with the present invention comprises: a parallel port connector 2, for the connection with a computer 1 (a PC, for example); two control units 3 and 4 connected to the computer 1 in parallel, wherein control units 3 and 4 are coupled to a peripheral devices 5 and 6 respectively. In this case, the peripheral devices 5 and 6 are a printer and a scanner respectively, and their data input terminals are coupled to the data bus (data_bus) of the parallel port connector 2.

Each of the control units (3 and 4) comprises: a recognition device (3a or 4a), wherein its input is coupled to the data_bus, and the on-line and off-line states between the peripheral device (5 or 6) and the computer 1 can be controlled by means of receiving the various identification codes from the data_bus; a latch device (3b or 4b), wherein its input terminal is coupled to the control bus (ctrl_bus) of the parallel port connector 2, its output terminal is coupled to the control input of the peripheral device (5 or 6), and the latch device (3b or 4b) determines whether to transmit control signals to the peripheral device or to latch the control signals, according to the output from the recognition device.

A selecting device (3c or 4c), which is a tri-state buffer in this embodiment, determines the connection between the status bus (stat_bus) of the parallel port connector 2 and the status output terminal of the peripheral device (5 or 6).

The identification code mentioned above has two types: an on-line code and off-line code. The off-line code is only one and is shared with all peripheral devices in common. However, every peripheral device has assigned a corresponding on-line code for recognition.

The process of the method for controlling the above parallel port is described in detail as follows.

(1) When the computer 1 switches its on-line state from the connection with a first device (here, a printer 5) to a second device (here, a scanner 6), first of all, the computer 1 stores the present control status and data status of the printer 5.

(2) The computer 1 outputs an off-line code through the data bus data_bus to both control units 3 and 4. After the recognition devices 3a and 4a have received the off-line code, their tri-state buffers 3c and 4c are set to high impedance states, thereby, disconnecting them from the status bus stat_bus. In the meantime, the control signals for the printer 5 are latched in the latch device 3b, thus disconnecting the connection between printer 5 and the computer 1.

(3) The computer 1 outputs the on-line code of the scanner 6 through the data bus (data_bus), and the control signals for scanner 6 through the control bus (ctrl_bus). After the recognition device 4a in the control unit 4 has received the on-line code, the latch device 4b is enabled to set the data free such that the control signals for scanner 6 can be transmitted to the scanner 6. In addition, the tri-state buffer 4c is activated to deliver the status of the scanner 6 to the computer 1 through the status bus (stat_bus). Therefore, the computer 1 and the scanner 6 are on-line connected, and the computer 1 keeps driving the scanner 6 until the scanning is completed.

(4) When the computer 1 is to switch its on-state from the connection with the scanner 6 to the printer 5, the computer 1 outputs the off-line code to the data bus (data_bus) such that the tri-state buffer 4c is set to a high impedance state, therefore scanner 6 releases its connection with the status bus. The connection between scanner 6 and computer 1 is disconnected and the control signal for the scanner is stored.

(5) The previous on-line control status stored in step (1) is recovered, and the computer 1 outputs the on-line code of the printer 5 to the data bus. Then, the computer 1 and the printer 5 are in an on-line connection state again.

(6) The previous on-line data status stored in step (1) is recovered, and then the computer 1 and printer 5 return to their original connection state.

From the above descriptions, it is quite obvious that the present invention achieves the switching control between buses and allows a single parallel port to connect multiple devices by way of utilizing a common off-line code and different on-line code assigned to each peripheral device. Therefore, the computer can achieve the object of switching between an on-line peripheral device and various peripheral devices. Furthermore, both the control method and the parallel port are very simple, therefore simplifying the circuit design and reducing the cost.

Figure 2A:
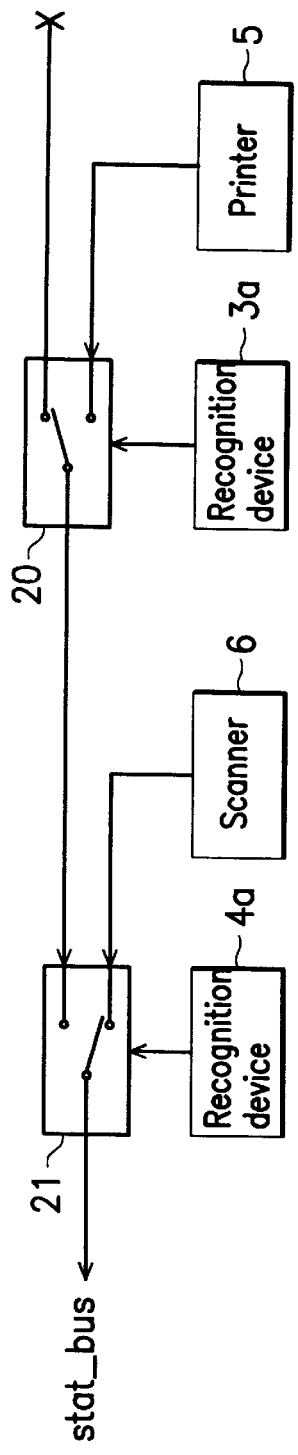
FIGS. 2A to 2C schematically depict circuit block diagrams of an example of the selecting device, applied in the parallel port in FIG. 1.
Figure 2B:
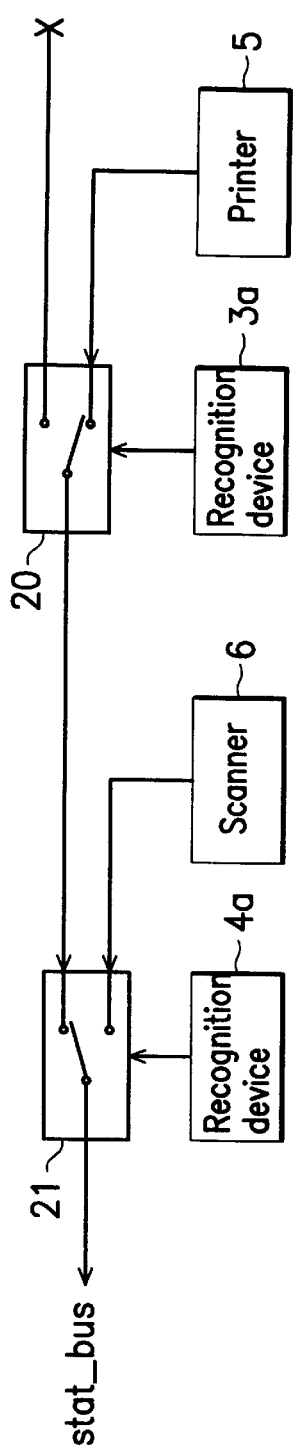
Figure 2C:
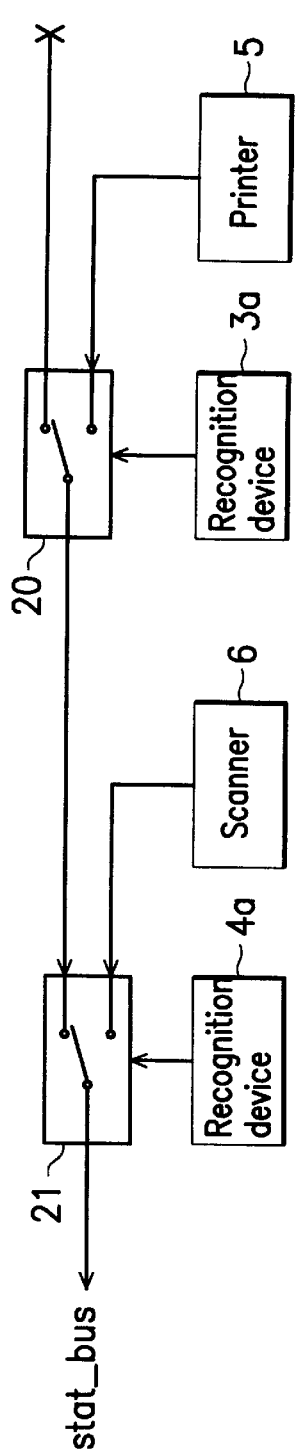

FIGS. 2A to 2C schematically depict a circuit block diagram of an example of the selecting device, applied in the parallel port of FIG. 1.

The implementation of selecting devices can also be a two-input multiplexer instead of the tri-state buffers. For simplicity, a portion of the parallel port according to the present invention is depicted in FIG. 2A to FIG. 2C.

Referring to FIG. 2A to FIG. 2C, two 2-input multiplexers, the first multiplexer 20 and the second multiplexer 20, are used to replace the tri-state buffers (3c, 4c) as the selecting devices.

The first input terminals of the multiplexers (20 and 21) are coupled to the status output terminals of the printer 5 and the scanner 6 respectively. The second input terminal of the second multiplexer 21 is coupled to the output of the multiplexer 20, and the second input terminal of the first multiplexer 20 is floated, or coupled to the output of the multiplexer 20 (that is, coupled to the status bus).

The selecting control inputs of the multiplexers (20 and 21) are coupled to the outputs of the recognition devices (3a and 4a) respectively. When the recognition device 4a receives the on-line code of the scanner 6, the multiplexer 21 selects the data at first input as an output data, delivering the status of the scanner 6 to the computer 1, as depicted in FIG. 2A. When the recognition device 3a receives the on-line code of the printer 5, the multiplexer 20 selects the data at first input as an output data and the multiplexer 21 selects the data at second input as an output, thus delivering the status of the printer 5 to the computer 1, as depicted in FIG. 2B.

When the multiplexers receive an off-line code, both the first and the second multiplexers (20 and 21) select their second inputs as outputs, therefore the status bus is floating, as depicted in FIG. 2C. Then, the printer 5 and the scanner 6 release the status bus and are disconnected from the computer 1.

Although the embodiment described here is a parallel port connecting two peripheral devices, it can also be applied to connect multiple peripheral devices. The controlling method is the same as mentioned above, and all that is necessary is to increase the control units connected in parallel, and assign new on-line codes to the peripheral devices added in.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of controlling a parallel port for connecting multiple devices to a computer, comprising the steps of:

storing a control status and a data status of a first device, which is one of the multiple devices and keeps on-line with said computer, when said computer is to switch on-line state from said first device to a second device (one of the multiple devices);

delivering an off-line code from said computer through a data bus to disconnect said first device from said computer and storing control signals of said first device;

delivering control signals of said second device through a control bus and an on-line code of said second device through said data bus, from said computer, to connect said second device to said computer and to drive said second device;

delivering said off-line code from said computer through said data bus to disconnect said second device from said computer and storing the control signals of said second device, when said computer is to switch the on-line state from said second device to said first device;

recovering the control status of said first device stored previously and delivering the on-line code of said first device to connect said first device to said computer; and recovering the data status of said first device to return to the on-line state of said computer in connecting to said first device.

2. The method as claimed in claim 1, wherein said multiple devices share the same off-line code in common, and said multiple devices have own different on-line codes respectively.

3. The method as claimed in claim 1, wherein the control and data status of any device is delivered to said computer through a status bus after being connected with said computer, and any device and said status bus are disconnected after receiving said off-line code.

4. A parallel port for connecting multiple devices to a computer, comprising:

a parallel port connector for connecting said computer;

a plurality of control units connected to said parallel port connector in parallel, wherein each control unit is connected with a peripheral device, and comprises:

a recognition device, an input of which is coupled to a data bus of said parallel port connector, controlling an on-line state and an off-line state between said computer and said peripheral device by means of receiving various identification codes on said data bus;

a latch device wherein an input of said latch device is coupled to a control bus of said parallel port connector, and an output of said latch device is coupled to a control input of said peripheral device, and control signals for connecting said peripheral device are transmitted to said peripheral device or latched according to output signals from said recognition device coupled to the control input of said latch device; and a selecting device receiving the output signals from said recognition device to determine a connection between a status bus of said parallel port connector and a status output terminal of said peripheral device.

5. The parallel port as claimed in claim 4, wherein when an identification code of said various identification codes is an off-line code, said recognition device disconnects said peripheral device from said status bus by controlling said selecting device, and when said peripheral device is connected with said parallel port originally, the control signals will be kept in said latch device and the connection with said status bus is disconnected by said selecting device.

6. The parallel port as claimed in claim 4, wherein said peripheral device has own identification code as an on-line code, and when said peripheral device receives said on-line code, said peripheral device is controlled by output signals of said latch device and said selecting device connects said peripheral device to said status bus.

7. The parallel port as claimed in claim 4, wherein said selecting device is a tri-state buffer, determining the connection between said peripheral device and said status bus.

8. The parallel port as claimed in claim 4, wherein said selecting device is a two-input multiplexer, and a first input of said two-input multiplexer is coupled to the status output terminal of said peripheral device, and a second input of said peripheral device is coupled to one input of the two-input multiplexer in other control units, and a control input of said two-input multiplexer is coupled to an output of said recognition device, and when said identification code received by said recognition device is an on-line code, said two-input multiplexer outputs data at said first input, and when said identification code is an off-line code or is another on-line code corresponding to other units, said two-input multiplexer outputs the data at said second input.

9. The parallel port as claimed in claim 8, wherein said status bus is connected to at least one output terminal of the multiplexers in all control units.

10. The parallel port as claimed in claim 4, wherein said peripheral device is one of the following devices: a printer, a scanner, or another device with the parallel port.

11. The parallel port as claimed in claim 4, wherein the data bus of said parallel port connector and the data input of said peripheral device are coupled together.

* * * * *